United States Patent [19]

Cuddon-Fletcher, deceased et al.

[11] 3,994,054

[45] Nov. 30, 1976

[54] MULTIPLE PART TUBULAR MEMBER AND METHOD AND APPARATUS FOR MANUFACTURE THEREOF

[75] Inventors: Angus N. Cuddon-Fletcher, deceased, late of Oshkosh, Wis., by Merilyn Smith, executrix; Greg J. Michels, Fond Du Lac, Wis.

[73] Assignee: Brunswick Corporation, Skokie, Ill.

[22] Filed: Jan. 6, 1975

[21] Appl. No.: 538,599

[52] U.S. Cl. .............................. 29/156.5 A; 29/416; 29/413; 225/2; 225/96.5; 225/97
[51] Int. Cl.² ..................... B23P 15/00; B26F 3/00
[58] Field of Search ............. 29/156.5 A, 413, 416; 225/2, 96, 96.5, 97, 103

[56] References Cited
UNITED STATES PATENTS

| | | | |
|---|---|---|---|
| 1,630,759 | 5/1927 | Pierce, Jr. | 225/2 |
| 2,553,935 | 5/1951 | Parks et al. | 29/156.5 A |
| 3,285,098 | 11/1966 | Beveridge | 29/413 |
| 3,405,434 | 10/1968 | Hoffman et al. | 29/413 |
| 3,658,220 | 4/1972 | Norton | 225/2 |
| 3,818,577 | 6/1974 | Bailey et al. | 29/413 |

*Primary Examiner*—Milton S. Mehr
*Assistant Examiner*—Daniel C. Crane
*Attorney, Agent, or Firm*—Andrus, Sceales, Starke & Sawall

[57] ABSTRACT

The crankshaft bearing cap of a connecting rod is formed from a forged rod blank which includes an integral circular head having an internal bearing surface and have integrally formed interconnecting lug portions. The lug portions are provided with cracking openings aligned with and parallel to a cracking plane. Each of the openings is provided with a cracking notch or recess which extends downwardly from one side of the head between twenty and fifty percent of the opening length. The assembly is located on a lubricated supporting bed with the unnotched face resting on the supporting surface. Interconnected cracking pins with a suitable tapered configuration are simultaneously forced into the cracking holes with an impact type force. The tapered pins are interconnected to a common support equalizing the cracking impact pressure as the pins are moved into cracking openings. Each of the notches is formed with a V-shape with an inclusive angle of forty-five degrees and a relatively shallow depth of from 0.010 to 0.020 inches to define a sharp apex in the cracking plane. Suitably sized and circumferentially spaced radial lubrication holes in the cap provide an improved lubrication and simplify the manufacturing process. The lubrication holes are spaced in accordance with the spacing of the needle roller bearings such that only one roller bearing is in aligned overlying relationship with each lubrication hole at any given instant.

18 Claims, 6 Drawing Figures

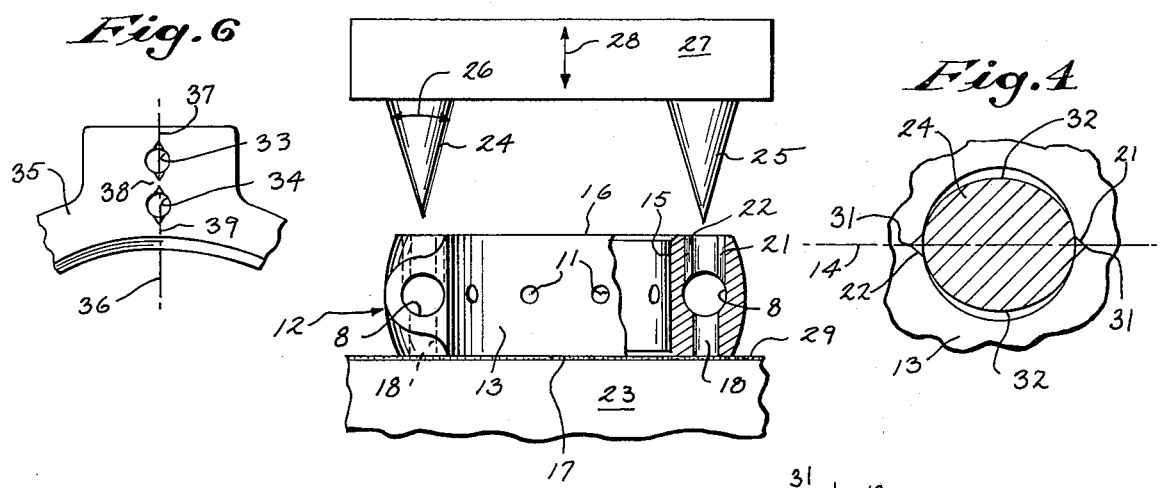
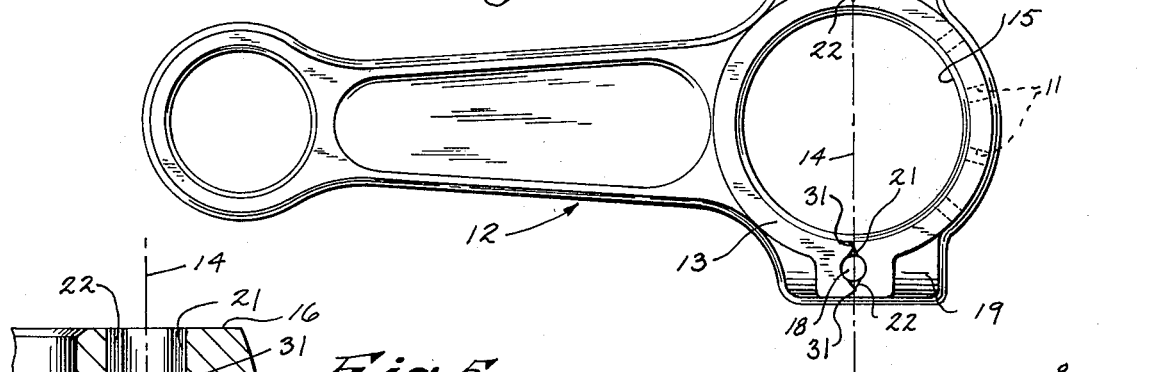
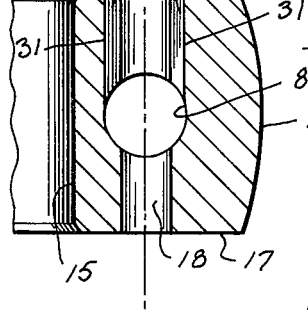
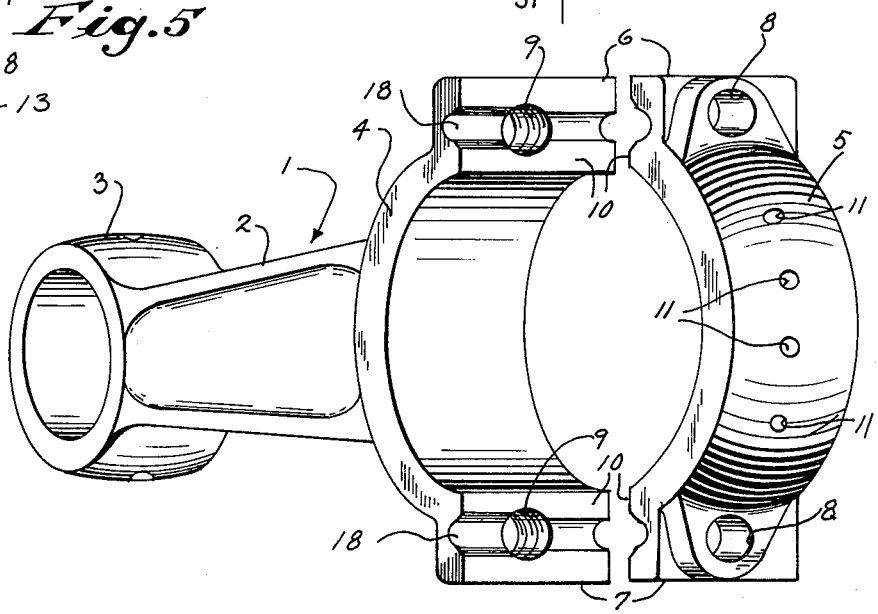

MULTIPLE PART TUBULAR MEMBER AND METHOD AND APPARATUS FOR MANUFACTURE THEREOF

BACKGROUND OF THE INVENTION

The present invention relates to a method and apparatus for making a multiple part tubular member such as a split bearing and, in particular, the crankshaft bearing of a connecting rod.

Connecting rods for internal combustion engines include a multiple part crank bearing having a separable semi-cylindrical cap which is bolted or otherwise releasably interconnected to a mating saddle integrally cast with the rod shank. A very simple method of manufacturing connecting rods with the separable cap is to cast the connecting rod in an integral blank having a head portion with the desired circular bearing opening. The head portion is weakened along a cracking or breaking line and pressure is applied to the head to cause separation by fracturing or cracking along the weakened plane.

In one cracking method the connecting rod head is weakened by removal of metal in cracking plane and with a radial, centrally located lubrication opening. In another prior art method, a plurality of cracking holes are located extending laterally through the connecting flange portion in parallel alignment with the cracking or separating plane through the crank head. The connecting rod is clamped within a suitable fixture with the cap portion projecting outwardly from a supporting edge surface aligned with the break plane. A force is applied to the upper surface of the cap portion thereby forcing the cap downwardly onto the supporting edge and resulting in a fracturing along the cracking plane.

Although such system has been proposed and provides many advantageous results, particularly from the standpoint of the economical production of engine connecting rods, a cracking system repeatably producing cracked rods which can be used in a commercial engine has not been obtainable as a mass production line process. Thus, generally employing the suggested cracking procedures resulted in an approximate 25 percent waste factor as a result of crack-generated faults. Thus, secondary cracks which extend from the split surface may be generated. Such secondary cracks result in failure in use and such units are waste. Further, chips may be generated on the thrust face of the cracked surfaces which would tend to lead to mismatch in the assembly with some out of roundness and the like, all of which would contribute to a relatively low useful life. Further loss or waste results from the creation of unacceptable residual stress within the cap structure as a result of the cracking in some of the units. Thus, although the method of forming a connecting rod cap by cracking has many advantages from the standpoint of economic and production, such advantages have been significantly reduced by the difficulty in maintaining adequate quality control.

SUMMARY OF THE INVENTION

The present invention is particularly directed to a method of forming a split encircling member by accurate cracking along predetermined cracking planes. In particular, as applied to a connecting rod, a forged rod blank includes an integral circular head having an internal bearing surface and having integrally formed interconnecting flanges or wall portions, with the crack plane located within such wall portion. The wall portions are provided with cracking openings or holes which are aligned with and parallel to the cracking plane. In accordance with the present invention, each of the openings is further provided with a special cracking notch or recess which is uniquely constructed to extend only partially downwardly from one side of the head and terminating significantly above the opposite face or surface of the head. The assembly is located on a supporting bed with the unnotched face resting on the supporting surface. Cracking means, such as pins with a suitable tapered configuration, are simultaneously forced into the cracking holes, preferably with an impact type force, with a cracking of the head through the cracking planes within the attachment wall portions.

In carrying out the invention, Applicants have found that the cracking in the spaced wall portions may not occur exactly simultaneously through both wall portions. The notched member is in accordance with a further novel feature of the invention, supported on a very low friction supporting surface with the notched end of the holes facing upwardly to receive the pins. Generally, a highly practical system has employed a supporting table with a thin lubricating film on a supporting face plate. Tapered pins interconnected to a common support equalizes the cracking impact pressure as the pins are moved into cracking openings. Applicants have found that the procedure resulted in a complete elimination of secondary cracks with a minimal amount of chipping and mismatch of the cap and rod. The resulting crack surfaces are of an excellent configuration providing firm positioning upon interconnection and including at most relatively small sharp projections which are easily broken on reassembly.

In carrying out the present invention, the forgings are rough machined to remove the copper plate in the areas to be cracked after which lubrication passageway means, cap bolt holes are drilled and tapped and partial finishing of the bearing opening is provided. The machined forged rod may also be carburized before or after forming the tapped bolt holes. Depending upon the time of carburizing, the bolt holes, threads and lubrication holes will or will not be in a hardened condition. The formed rod is quenched and finally processed in accordance with the novel cracking procedure.

Generally, for optimum results, the notches formed in the cracking holes are provided on both the inner and outer edges in the cracking plane. Each of the notches extends from twenty to fifty percent of the depth of the head to terminate at or outwardly of the interconnecting bolt holes and are formed with a V-shaped and a relatively shallow depth to define a sharp apex in the cracking plane. A notch having an inclusive angle of 45° and a depth of ten to twenty thousandth of an inch is recommenced, with the notch extending approximately 25 to 30 percent through the length of the cracking hole. The cracking pins are formed with an inclusive angle of the order of thirty degrees and are interconnected to a common force transmitting saddle. The portions of the pins spaced from the notched portions of the holes may be relieved to increase the force on the notched portions. Applicants have found that the crack follows the notch downwardly throughout the depth of the notch and then propagates cleanly through the remainder of the hole. A final crack is obtained without secondary cracks or chips or without any practically significant secondary cracks or chips. As a result a clean, smooth break is developed resulting in a very smooth bearing surface in the rod which can be directly employed in accordance with the normal procedures.

Further, in the lubrication of the connecting rod for a two-cylinder engine or the like a lubricating passageway means is provided on the inner bearing surface. Conventionally, a centrally located circumferential groove is provided in the cap. Although such systems have provided satisfactory lubrication, optimum lubrication of the roller bed has generally not been obtained. Thus, under certain conditions, such as an inertial load exceeding the gas load within the bearing, the cap becomes the loaded area of the bearing. Under such conditions, the elongated slot tends to reduce the capacitor of the bearing because the heavily loaded center section and the several needle bearings roll over the slots simultaneously. One continuous slot also tends to weaken the cap. Further, the continuous circumferential lines provided by the slot presents two continuous wear lines. Some difficulty is also encountered in rapidly and conveniently deburring the long sharp edges defined by the inner curved surface on a cap. Applicants have found suitably spaced and sized circumferentially spaced holes in the cap provide an improved lubrication and simplify the manufacturing process. The lubrication holes are spaced in accordance with the spacing of the roller bearings and, in particular, are so spaced such that only one roller bearing is in aligned overlying relationship with each lubrication hole at any given instant. The lubrication holes are conveniently formed and deburred in the cap with a greater strength than a cap with the conventional circumferential groove.

The present invention thus provides a highly improved method of manufacturing and forming a split cylindrical member and particularly the bearing unit of a connecting rod.

BRIEF DESCRIPTION OF THE DRAWING

The drawing furnished herewith illustrates the best modes presently contemplated by the inventor for carrying out the subject invention in which the above advantages and features are clearly disclosed as well as others which will be readily understood from the following description of such embodiments.

In the drawing:

FIG. 1 is an exploded view showing the formed cracked rod constructed in accordance with the teaching of the present invention;

FIG. 2 is an enlarged plan view of a connecting rod blank constructed in accordance with the present invention;

FIG. 3 is a side elevational view of a connecting rod cracking apparatus with a connecting rod blank located in position for cracking in accordance with the teaching of the present invention;

FIG. 4 is an enlarged fragmentary view of the crank end of the rod blank;

FIG. 5 is a vertical section taken generally on line 5—5 of FIG. 2; and

FIG. 6 is a fragmentary view of a portion of a blank illustrating an alternative cracking hole arrangement for cracking of a cylindrical member in accordance with the present invention.

DESCRIPTION OF THE ILLUSTRATED EMBODIMENTS

Referring to the drawing and particularly to FIG. 1, the present invention is illustrated as applied to forming of a connecting rod 1 for internal combustion engines. The illustrated connecting rod generally includes a shank portion 2 with a wrist pin boss 3 integrally formed on the one end for interconnection to a piston pin. The opposite end of the connecting rod 1 includes a two-piece crankshaft head which is formed of two separable parts including an integral saddle 4 and a removable cap 5. The saddle 4 and cap 5 are formed with integrally side connecting lugs 6 and 7 on diametrically opposite sides thereof. The cap lugs 6 and 7 are provided with a bolt opening 8 parallel to the shank while the saddle lugs are provided with aligned and appropriately tapped openings 9. A connecting bolt, not shown, draws the cap 5 into tight clamping engagement to saddle 4 with the opposing surfaces 10 of the lugs 6 and 7 abutting each other to define a circular crank receiving bearing opening. The crank bearing opening may be provided with a needle bearing, not shown, and appropriately clamped to a highly finished crankshaft to provide interconnection between the crankshaft and the piston. The illustrated connecting rod 1 is further provided with novel lubrication means provided by circumferentially distributed lubrication holes 11 in the cap 5.

The present invention is particularly directed to the method of forming the separable cap 5 by a highly improved cracking process. In accordance with the present invention, a connecting rod blank 12, shown in FIG. 2, is forged including a wrist pin boss and an integral circular head 13 which, when split along a common plane 14, forms the saddle and cap of the final rod 1. The wrist pin boss and the head any be appropriately processed and in particular to provide the desired round or cylindrical crank opening 15 as well as the necessary wrist pin opening member, the formation of the cap screw openings and the like.

The forged integral connecting rod blank 12 is rough machined to at least remove the copper plate existing in the area of the cracking plane and to provide relatively flat end faces 16 and 17 to the opposite side of the head 13. Cracking openings 18 are formed one each in each of the connecting flange portions 19 with a diameter approximately the size of the clamping bolt opening 8. Each of the openings 18 is correspondingly formed and one opening 18 is particularly described with the corresponding portions of the other opening 18 identified by similar primed numbers. The cracking opening 18 is located with its axis located in the cracking plane 14 and extends parallel to the crank bearing axis of the bearing opening 15.

Further, in order to reliably crack the head, Applicants have found that the cracking opening 18 must be provided with a unique weakening in the desired cracking plane 14 and that the connecting rod, for optimum results, should be especially supported to promote the desired planar cracking. In accordance with the present invention, the cracking opening 18 is provided with a pair of notches 21 and 22 on diametrically opposite sides in the cracking plane 14. The notches 21 and 22 extend partially from the one end face 16 of the head 13 toward the opposite of the face 17 terminating within the openings 18, as most clearly shown in FIG. 5.

As shown in FIG. 3, in carrying out the invention, the rod blank 12 with the notched cracking openings 18 is supported on a suitable table or bed 23. A pair of cracking members 24 and 25 are simultaneously forced into the cracking openings 18 under a cracking force and preferably with an impact force, with the resulting stress causing the head to crack along the plane and the cap to separate from the saddle.

The cracking members 24 and 25 are illustrated as pins formed with a taper. In a practical application, as hereinafter discussed, the pins had an interior angle 26 of 30°. The pins 24 and 25 are interconnected to each other by a saddle 27 to provide equalization of the impact force between the two pins. The saddle is connected to a reciprocating force source as diagrammatically illustrated by the double headed force arrow 28.

Although the impact forces are simultaneously applied to the cracking pins 24 and 25 such that the cracking forces are simultaneously applied to the opposite sides of the head 13, the one side may break before the opposite side. Applicants have found that the blank 12 is advantageously supported on a low friction surface to permit relative movement of the opposite sides of the cap. The movement also avoids distortion by excessive penetration of the pin into the first breaking area. The supporting surface of the table 23 is shown with a low friction covering 29 such as a thin film of oil to permit cap movement.

More particularly, Applicants have found that the length of each notch 21 and 22 shall be at least of the order of twenty percent of the total length of the cracking opening 18 but essentially no more tha fifty percent of the length of the opening. Applicants have found that with this construction, the crack will repeatedly extend progressively down through the notched area in the desired cracking plane 14 and then will propagate downwardly through the unnotched portion in the same plane. This is in contrast to a complete notch where significant and almost inevitable departure of the cracking plane from the notch occurs, either completely or in the form of undesired and unacceptable secondary cracks. Such undesirable cracking departure is unacceptable because it prevents the formation of true mating surfaces which are essential to reassembly of the cap to the head with a true cylindrical bearing opening. Although precise reason for this completely unexpected results is not fully shown, a reasonable theory is that the opening with a total notch results in the creation of weakened areas within the metal competing with the notch as the crack propagates downwardly through the flanged portions. In any event, experiments have clearly shown the creation of the secondary cracks and the chipped characteristic with a complete scoring or notching and with essentially complete elimination of such undesired faults with the partial notches 21 and 22.

The notches 21 and 22 are preferably shallow and V-shaped, as shown more clearly in FIG. 4, with a sharp, line apex 31 located in the cracking plane 14. Although the depth of the notches 21 and 22 is not critical, Applicants have generally found that a shallow notch provides somewhat improved results. The more shallow notch appears to create a somewhat sharper apex 31 resulting in improved creation of the cracked plane. In a practical application, a notch of a depth of approximately 0.010 to 0.020 inches provided better results than notches in a range of 0.025 to 0.035 inches. The inclusive angle of the notch is similarly not critical but generally an inclusive angle of the order of 45 percent has been found to produce highly satisfactory results.

In particular, a series of cracked rods have been formed from conventionally forged integral connecting rod blanks mounted on a lubricated table beneath a pair of cracking pins having an interior angle of 30°. The pins were moved downwardly into the notched holes with a three hundred pound force traveling at a rate of 8 to 10 inches per second. Each rod blank was provided with notches having an inclusive angle of 45° and having a depth of between 0.010 to 0.020 inches. The length of each notch with respect to the total length of the hole was approximately 25 to 30 percent of the total depth. The rod blanks 12 were provided with the lubrication and the clamping bolt openings 8, 9 and 11. The rod blanks were also carburized, with some before and some after the forming of the several lubrication and cap bolt holes. The blanks were quenched and then cracked in accordance with the present invention, including careful initial fitting of cap to rod after cracking but before the final plating and honing. Care should also be exercised to maintain the concentricity of the threaded openings, thrust collars and cap bolts for optimum results.

Life tests on such rods have indicated complete continuous satisfactory operation. Of forty connecting rods so processed, only one had insignificant chipping and another had a slight mismatch. Both, upon reassembly, operated satisfactorily. None of the rods so processed had secondary cracks.

Further, the portions of the cracking pins 21 and 22 which are not in contact with the notched area of the cracking holes 18 may be relieved, as shown at 32 in FIG. 4, so that upon creation of the impact the maximum pressure is brought to bear directly on the area of the notches 21 and 22.

However, the type and method of imparting the impact forces is not critical and the several factors discussed above are given because they appear to contribute to a cleaner cracked surface and thus provide an optimum product.

In the conventional connecting rod employed in outboard motors and the like, the rods are secured to the crankshaft with a needle roller bearing unit, not shown, and a circumferential lubrication groove formed within the cap. In the embodiment shown in FIG. 1, four holes 11 provide the lubrication means.

In accordance with a further teaching of the present invention, the connecting rod cap 5 is formed with the special lubricating holes 11 extended through the cap 5 in place of the more conventional, circumferential, centrally located circumferential slot. Four properly sized and spaced holes in the cap do not unduly weaken the cap 5 while improving the lubrication efficiency. Although the bearing capacity may be slightly reduced, Applicants have not found any reduction in the operating life. Further, the elimination of the sharp load edges improves the wear pattern in relationship to the needle roller bed. The individual holes are also much easier to deburr than the long sharp slot edges of a conventional construction.

In order to prevent interference as a result of the connecting cap bolts, the four lubrication holes 11 must be located within a limited central cap sector, which, in a particular construction, is a sector of 80° and thirty minutes. In the practical construction, the bearing rollers of the bearing unit are spaced approximately 22° and 30 minutes. Theoretically, for optimum results, the lubrication holes 11 would be spaced one-quarter or approximately twenty-two and one-half degrees plus one-quarter of such distance for a total of 28.12°. This construction would assure that no more than one roller bearing is overlying a lubrication hole at any one time and produces an improved lubrication system, with mimimum wear characteristics with respect to the lubrication openings.

However, as the lubricating holes 11 must fall within a central sector of 82° and 30 minutes to prevent interference from the heads of the cap bolts, Applicants have found that a slight reduced spacing may be employed with improved lubricating characteristics when compared to the conventional slot. Thus, spacing of the holes by 27° and 30 minutes, as shown, spaces the holes from the location of the cap bolts while producing adequate lubrication. Further, the single bearing per lubrication hole relationship is essentially maintained.

Although illustrated in FIGS. 1 - 6 with a single cracking hole in each connection portion 19, a plurality of smaller cracking holes may be employed, for example, as shown in FIG. 6. When employing a pair of holes 33 and 34 in a member 35 to be cracked, they are aligned with the cracking plane 36 and each must be notched to the radial inside or outside bearing surface and at least one must be notched to the interior side in order to develop and provide a cracking path through several portions 37, 38 and 39 of the lug portion to the opposite sides of the cracking openings 33 and 34.

In the illustrated embodiment the holes 33 and 34 are each notched to the interior side in portion 37 and the exterior sides in portions 36 and 37. The notches have a V-shape with the apex lying on the cracking plane 35. Otherwise the formed member 35 is similarly processed by locating of the member on a suitable low friction surface and simultaneously introducing a plurality of cracking elements into the several cracking openings from the notched side thereof.

The present invention thus provides a highly improved method of forming a cracked connecting rod and in particular further provides an improved lubrication.

Various modes of carrying out the invention are contemplated as being within the scope of the following claims particularly pointing out and distinctly claiming the subject matter which is regarded as the invention.

We claim:

1. The method of splitting a member along a common plane, comprising providing a cracking opening in said member, said cracking opening lying in the cracking plane, forming opposed and oppositely located notches in the wall of the opening in the cracking plane and each notch having sidewalls extending outwardly from the opening and toward each other into the member to a common line connection lying in the cracking plane and essentially extending parallel to the axis of the opening and each notch extending from an impact receiving end of said member inwardly less than the total length of the opening, and forcing a cracking member into said opening from said impact receiving end to split the member along said plane.

2. The method of manufacturing a split tubular unit from an integral tubular blank by cracking along the planes between the individual split members of the tubular unit comprising forming cracking openings with the cracking openings located within the cracking planes, forming opposed and oppositely located notches in the walls of said cracking openings in the cracking plane, each of said notches having sidewalls extending outwardly from the opening and toward each other into the member to a common line connection lying in the cracking plane and each notch extending parallel to the axis of the opening and extending from an impact receiving end of said member inwardly less than the total length of the opening, supporting a non-notched side of the tubular blank, forcing a cracking element into the cracking openings from the notched side of the cylindrical member to thereby generate and propagate cracking downwardly in said planes to split the member along said planes.

3. In the method of claim 2 wherein said notches are formed extending through said cracking openings approximately between 20 and 50 percent of the total length of the cracking openings.

4. The method of claim 3 including the providing of a low friction surface to the supported side of said tubular blank.

5. In the method of claim 3 including the step of forming each of said notches with a V-shape having an apex line in the cracking plane.

6. In the method of claim 4 wherein said notches are formed having a depth of approximately 0.010 to 0.020 inches.

7. The method of manufacturing a split cylindrical member from an integral blank, said cylindrical member being split to the opposite sides thereof in a common cracking plane, forming cracking openings to the opposite side of the cylindrical member with the axis of the openings in the cracking plane, forming opposed and oppositely located notches in the wall of the opening in the cracking plane, each notch having sidewalls extending outwardly from the opening and toward each other into the member to a common line connection lying in the cracking plane and essentially extending parallel to the axis of the opening and each notch extending from an impact receiving end of said member inwardly less than the total length of the opening, supporting a non-notched side of the cylindrical member on a low friction supporting means, and forcing cracking members into the cracking openings from the notched side of the cylindrical member to thereby generate and propagate cracking downwardly in said plane to split the member along said plane.

8. The method of claim 7 including the step of connecting said cracking members to a common force receiving element to equalize the cracking forces.

9. The method of claim 8 wherein said forcing step includes creation of a sharp, impact movement of said cracking members.

10. In the method of claim 7 wherein said notches are formed extending through said opening approximately between 20 and 50 percent of the total length of the opening.

11. The method of claim 7 including the step of forming said notches with a V-shape having an apex line in the cracking plane.

12. The method of claim 7 including covering the upper surface of the supporting means with a thin lubricating film and locating the unnotched side of the cylindrical member on the lubricating film.

13. The method of forming a connecting rod comprising the step of forming an integral metal rod having a connecting shank with an integral wrist pin boss on one end and a crankshaft head at the opposite end, said crankshaft head having an internal cylindrical opening and having outer laterally extending connecting lugs parallel to the shank, forming cracking holes through the connecting lugs, said holes being precisely aligned with the separating plane in said connecting lugs, forming opposed and oppositely located notches in the wall of said cracking holes in the cracking plane, each of said notches having sidewalls extending outwardly from the opening into the member and toward each other to a common line connection lying in the cracking plane and each notch extending between 20 and 50 percent of the length of the hole, locating said integral rod on a horizontal bed having a low friction upper surface, and introducing interconnected, cracking pins into said holes from the notched end of said holes to split the rod along said plane.

14. The method of claim 13 wherein said notches are formed as V-shaped members with the apex located in the cracking plane.

15. The method of claim 13 wherein said cracking pins are moved with an impact of essentially three hundred pounds force traveling at a rate of 8 to 10 inches per second.

16. The method of forming a connecting rod of claim 13 including the step of rough machining said blank and forming connecting bolt holes in said outer laterally extending connecting lugs parallel to the shak prior to cracking of said head.

17. The method of claim 16 including the step of carburizing said blank.

18. The method of claim 13 including the step of forming the head of the blank with a plurality of radial lubricating holes in the cap portion, said holes being centrally located and spaced to accommodate needle roller bearings correspondingly spaced within the cap portion.

* * * * *